Aug. 12, 1924.
P. LIPMAN
1,504,631
MECHANICAL TOY
Filed Dec. 12, 1923
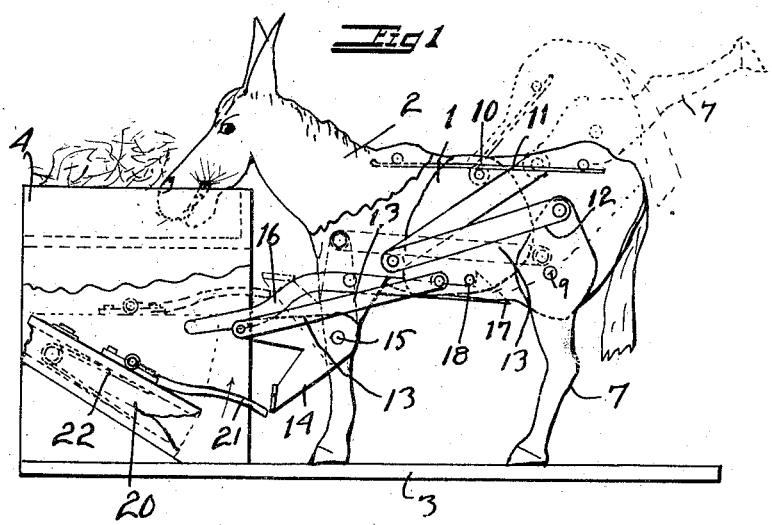
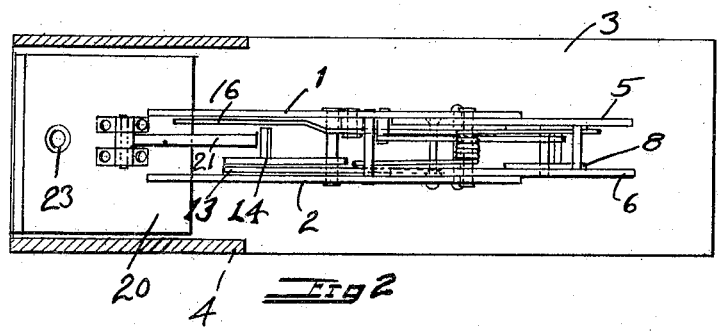
INVENTOR.
Paul Lipman
BY
Carlos P. Griffin
ATTORNEY.

Patented Aug. 12, 1924.

1,504,631

UNITED STATES PATENT OFFICE.

PAUL LIPMAN, OF SAN FRANCISCO, CALIFORNIA.

MECHANICAL TOY.

Application filed December 12, 1923. Serial No. 680,109.

*To all whom it may concern:*

Be it known that I, PAUL LIPMAN, a citizen of the United States, residing at 830 Broderick Street, San Francisco, in the county of San Francisco, State of California, have invented a new and useful Mechanical Toy, of which the following is a specification, in such full and clear terms as will enable those skilled in the art to construct and use the same.

This invention relates to a mechanical toy and its object is to provide a construction which will be capable of delayed operation whereby different illusions may be produced by having the movement take place at a time subsequent to the setting of the device.

It will be understood by those skilled in the art that while the figure of an animal has been shown to display the action in this case that the silhouette of any object may be used instead of that one.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a side elevation of the toy one portion of the figure being removed for purposes of illustration, Fig. 2 is a plan view of the device, a portion of the stand at one end, being cut away for purposes of illustration.

The figure used in the present instance is a donkey consisting of two plates 1 and 2 supported on a base 3, with the head of the donkey reaching into, what appears to be, a feed box 4. The hind part of the animal consists of two plates 5 and 6 forming the body, and two plates 7 and 8 forming the legs. The legs 7 and 8 are pivoted to the rear portion of the body at 9 and the rear portion of the body is in turn pivoted to the front body portion at 10, a stiff spring tending to hold the rear portion of the animal normally in the position shown in dotted lines in Fig. 1.

A link 12 connects one portion of the hind leg to the fixed body, and a link 13 connects the rear body plates to a bellcrank 14 pivoted at 15 to the front leg. A lever 16 with a hook 17, is pivoted on the body to engage a pin 18 and to hold the rear body portion down when depressed by hand. As the rear body portion of the animal is depressed the bell crank operates to compress the bellows 20 with the aid of the pivotally mounted lever 21, a stiff spring 22, within the bellows, tending to restore it to its initial position. The spring is retarded in its upward movement by the action of a small rubber valve 23 which allows the air to return to the bellows very slowly.

In operation the animal is set as illustrated in solid lines Fig. 1, and ordinarily the trigger will be released in about 30 seconds by the top of the bellows striking the end of the hook lever 16.

The two sides of the animal will have suitable rods and spacing bushings connecting them to properly space and support the two sides of the animal at a suitable distance from each other to produce desirable visual effect.

What I claim is as follows, but modifications may be made in carrying out the invention shown in the drawings and in the above particularly described form thereof within the purview of the invention as defined by the annexed claim:

In a mechanical toy, the combination with a base of a figure mounted thereon having a movable section, a spring to hold said section normally in one position, a catch to hold said movable section in another position, a bellows, means connected with the movable section of the figure to collapse the bellows, a catch to hold the movable section in a position different from the normal position, and means whereby the bellows will be slightly expanded to release the movable section of the figure a short time after it has been set.

In testimony whereof I have hereunto set my hand this 27th day of November A. D. 1923.

PAUL LIPMAN.